(No Model.)
E. HARRIS.
SAW TOOTH.
No. 292,809. Patented Feb. 5, 1884.
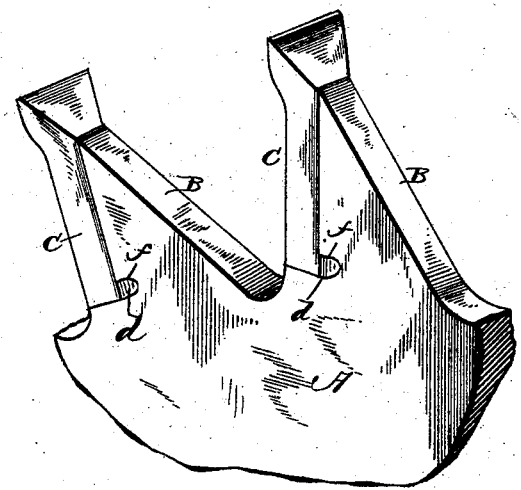
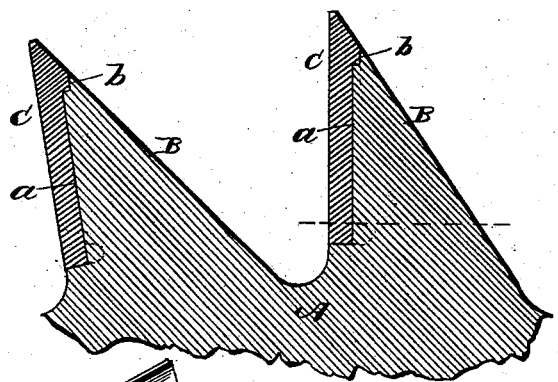
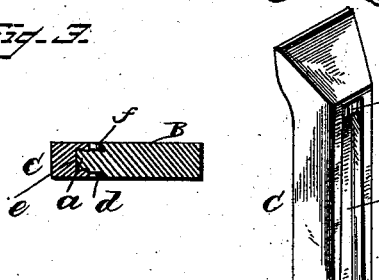
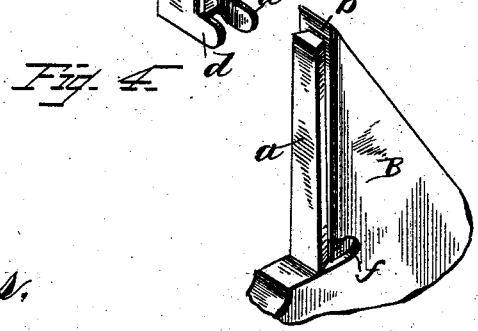
WITNESSES
F. L. Ourand
E. G. Siggers
Enoch Harris
INVENTOR
by C. A. Snow & Co
Attorneys

UNITED STATES PATENT OFFICE.

ENOCH HARRIS, OF QUINCY, ILLINOIS.

SAW-TOOTH.

SPECIFICATION forming part of Letters Patent No. 292,809, dated February 5, 1884.

Application filed December 20, 1883. (No model.)

*To all whom it may concern:*

Be it known that I, ENOCH HARRIS, a citizen of the United States, residing at Quincy, in the county of Adams and State of Illinois, have invented a new and useful Improvement in Saw-Teeth, of which the following is a specification, reference being had to the accompanying drawings.

This invention relates to saw-teeth; and it has for its object to provide an insertible tooth which will be simple in its construction and readily applied to the saw, so as to be held securely in place and prevented from slipping off, all as hereinafter set forth, and particularly pointed out in the claims.

In the accompanying drawings, Figure 1 is a perspective view of a portion of a saw, showing the insertible tooth in position. Fig. 2 is a longitudinal section of the same. Fig. 3 is a transverse section. Fig. 4 is a perspective view, illustrating the manner of applying the insertible tooth.

Like letters refer to corresponding parts in the several figures.

Referring to the drawings, A designates the blade of the saw, having the solid teeth B formed on their rear faces, with a dovetailed projection, $a$, the upper end of the projection being cut away or recessed, as at $b$.

C designates the insertible teeth, formed on one side with a dovetailed groove or slot, $e$, in which the projection $a$ fits, the lower end of the said teeth being formed with lugs or ears $d$, adapted to engage with corresponding depressions, $f$, in the blade of the saw. The recess $b$ allows the projection $a$ to rest nicely within the slot $e$, the upper end of teeth B fitting within a groove, $g$, of the teeth C, so that the beveled upper face of said teeth C will correspond with the inclination of the solid teeth. The dovetailed projection and slot $a$ $e$ increase in size from the outer end, so that the narrowest point of the same is at the outer end of the saw, and thus, when the insertible teeth are driven inward, there will be no danger of them coming off, since the tapering dovetailed projection will tightly fit the tapering dovetailed slot and hold the parts together. To obviate any possible danger, I provide the ears or lugs $d$ as above mentioned, and thus when the teeth are once secured in place they will be held securely from accidental displacement.

My improved insertible saw-teeth will be found to hold themselves in place in a safe and efficient manner, and since the construction is very simple the cost of the saw will be lessened to a considerable degree.

The gradually-increasing size of projection $a$ and the corresponding shape of slot $e$ is an important feature of my invention, since the insertible tooth will be driven down more securely by this construction.

My invention is simple, durable, and efficient, and will prove of great advantage in its application to all classes of saws.

Having described my invention, I claim as my own—

1. In a saw, the blade A, having the solid teeth B, formed with the dovetailed projection $a$, in combination with the insertible teeth C, formed with a dovetailed slot, $e$, the projection $a$ gradually decreasing in size in an outward direction, and the slot $e$ corresponding with the projection, as set forth.

2. In a saw, the blade A, having the solid teeth B and the depressions $f$, said teeth being formed with a dovetailed projection, $a$, having a recess, $b$, in combination with the insertible teeth C, formed with the dovetailed slot $e$, and the ears or lugs $d$, as set forth.

In testimony that I claim the foregoing as my own I have hereto affixed my signature in presence of two witnesses.

ENOCH HARRIS.

Witnesses:
   JNO. P. BEERS,
   EDWARD ELLIOTT.